United States Patent Office 3,361,681
Patented Jan. 2, 1968

3,361,681
TITANIUM TETRAIODIDE SUSPENSIONS
Albert R. Muller, Akron, Ohio, assignor to The Goodyear Tire & Rubber Company, Akron, Ohio, a corporation of Ohio
No Drawing. Filed June 26, 1964, Ser. No. 378,461
10 Claims. (Cl. 252—429)

This invention relates to a process for preparing suspensions of titanium tetraiodide ($TiI_4$). More particularly it relates to the suspension of a small particle size $TiI_4$ that is substantially free of iodine ($I_2$) in a medium that is semi-solid or solid below the freezing point of $TiI_4$.

Titanium tetraiodide is useful, among other things, for certain stereospecific polymerizations. Prior to this invention, when used in stereospecific polymerizations, $TiI_4$ was handled as a suspension in some light liquid hydrocarbon solvent which, most often, was the reactant diluent. This previous method was not entirely satisfactory in that expensive grinding equipment had to be employed to achieve an acceptably small particle size, and even then, the particles had a tendency to settle and made proper metering difficult. In addition, the $TiI_4$ was normally maintained in crystalline form during shipping and storage until ready for use. During that time considerable free iodine was evolved due to sublimation, and this free iodine when mixed with $TiI_4$ had a deleterious effect on polymerization reactions.

It is, therefore, an object of this invention to provide a process whereby $TiI_4$ may be made available in a usefully small particle size without employing grinding equipment. It is a further object of this invention to provide $TiI_4$ in a more useful form that is substantially free of elemental iodine. It is a still further object to provide $TiI_4$ in a form that may be shipped, stored, metered and employed in a polymerization system without the necessity of additional processing. Other objects will become apparent as the description proceeds.

These objects are accomplished by heating $TiI_4$ to a molten state and mixing the molten $TiI_4$ with a hydrocarbon which has the property of existing in a semi-solid state over a broad temperature range. If a small particle size of $TiI_4$ is desired then mixing should be accomplished by high shear means. When a composition that is low in free iodine content is desired, further heating and distillation of the $TiI_4$ will accomplish the desired result. If particle size is immaterial, it does not matter whether mixing precedes, follows or occurs simultaneously with the distillation step. If particle size is of concern, then mixing by high shear means should be accomplished concurrently with distillation or after this step is completed, providing the $TiI_4$ is not allowed to cool below the molten state.

HANDLING THE TITANIUM TETRAIODIDE

The $TiI_4$ which is employed in the practice of this invention may be obtained from commercial sources or prepared by methods known to those skilled in the art. To obtain the compound in the molten state it should be heated to at least 150° C. based on standard conditions. To distill off the free iodine, the vapor pressure must be increased. However, above 1300° C., the $TiI_4$ begins to decompose and this temperature should not be exceeded. Ideally, conditions will be imposed whereby the maximum removal of free iodine will be achieved with a minimum loss of $TiI_4$. Conditions under which the $TiI_4$ is treated are therefore not observed to be critical, but may be usefully varied to achieve the specific purpose of those employing the process.

THE VISCOUS HYDROCARBON

The hydrocarbon which is employed as a carrier for the $TiI_4$ in this invention should be chosen from the class of heavy hydrocarbons that has the property of existing in a semi-solid state over a broad range of temperature. Representative of this class are petrolatums, paraffin waxes and heavy petroleum oils. The preferred members of this group will be those having the property of a semi-solid below the freezing point of $TiI_4$.

Of these, petroleum has been found to be most convenient to use and little need be said concerning this relatively old and well known compound which is available from commercial sources. However, it should be pointed out that the success of various processes employing $TiI_4$ depends on the purity of the overall system. Therefore, it may be necessary to purify the petrolatum to meet the requirements of final use. A useful method of removing water and oxygen is to prepare a solution of petrolatum in a light hydrocarbon solvent, such as benzene or pentane, which will form an azeotrope with impurities and then to distill. Other methods of purification will present themselves to those skilled in the art, and are also suitable for paraffin waxes and heavy petroleum oils.

Mixing of $TiI_4$ and the semi-solid hydrocarbon may be accomplished by a variety of means, and the particular means selected will depend on the particle size of the $TiI_4$ desired in the final composition. For instance, if particle size is of no importance and this invention is employed only as a means of reducing the free iodine content, paddle type agitation may be sufficient. On the other hand, to obtain very small particle size, high shear mixing means will be employed. For laboratory purposes a Waring Blendor has been found quite suitable. For large scale preparations a process similar to that used in the processing of homogenized milk could be usefully employed.

Each step in the process of this invention should be carried out in an inert environment. That is to say, an environment which does not react with the heavy hydrocarbon or the $TiI_4$ and which will not dissolve in the suspension to the detriment of an end use process. Many such environments will occur to those skilled in the art, but an inert gas such as dry nitrogen or argon will often be found to be acceptable and the most convenient.

The following example is given by way of illustration and not a limitation of the present invention.

Example

CHARGING AND DISTILLING $TiI_4$

A three-liter Morton flask was purged with dry nitrogen and loaded with 680 grams of $TiI_4$ in the form of ⅜″ diameter pieces, as supplied by the manufacturer, in a glove box in a dry nitrogen atmosphere.

The flask containing $TiI_4$ was then heated to 185° C. at 1 atmosphere with a gentle dry nitrogen purge passing through the flask. Approximately 35 grams of $I_2$ or 5% of the original weight of $TiI_4$ was distilled from the original 680 grams charge at 185° C. with a dry nitrogen sweep on the flask.

This distillation was performed to remove the uncombined $I_2$ from the $TiI_4$ yielding a purified $TiI_4$.

PREPARATION OF PETROLATUM

Approximately 200 grams of thiophene free benzene was added to 700 grams of petrolatum. The mixture was heated and benzene was distilled from the mixture in order to remove water and oxygen from the petrolatum. After distillation, the petrolatum was kept in a dry nitrogen atmosphere. A water analysis was performed on the distilled petrolatum via Karl Fischer reagent, and the purified petrolatum contained 20 parts per million of water.

MAKING TiI₄ DISPERSION

The molten purified TiI$_4$ was cooled to 160° C. in the Morton flask under a dry nitrogen atmosphere. Six-hundred and eighty grams of purified petrolatum were added at 160° C. to the molten TiI$_4$ with a dry nitrogen purge on both the TiI$_4$ and petrolatum flasks.

The molten TiI$_4$ and petrolatum were agitated by a high shear dispersator operating at 20,000 r.p.m. for thirty minutes under a dry nitrogen purge. The dispersion was then cooled with periodic gentle swirling until the viscosity increased to approximately 1,000 cps. At this point, the dispersion was then diluted with more dried petrolatum and allowed to cool to room temperature.

ANALYSIS AND TESTING

The TiI$_4$ dispersion was examined under an optical microscope and the particle size was found to range between 15 and 65 microns with an average of 40 microns.

The dispersion was analyzed for free I$_2$ and I$^-$ content. The results of this analysis was 14.724% I$^-$ and 0.278% I$_2$, or a calculated 16.135% TiI$_4$. This dispersion was employed as a catalyst ingredient in the polymerization of 1,3-butadiene and proved to be successful.

While certain representative embodiments and details have been shown for the purpose of illustrating this invention, it will be apparent to those skilled in the art that various changes and modifications may be made therein without departing from the spirit or scope of the invention.

What is claimed is:

1. A process for preparing a titanium tetraiodide suspension comprising in an inert environment (a) heating TiI$_4$ to a temperature from at least 150° C. to 1,300° C. but below the decomposition temperature of TiI$_4$ (b) mixing by high shear mixing means with a hydrocarbon which has the property of existing in a semi-solid state over a broad temperature range, and (c) cooling the mixture to below the freezing point of TiI$_4$.

2. A process according to claim 1 wherein said hydrocarbon is at least one member selected from the group consisting of petrolatums, paraffin waxes and heavy petroleum oils.

3. A process according to claim 2 wherein said hydrocarbon is a petrolatum.

4. A process according to claim 1 wherein a suspension is formed having a TiI$_4$ particle size in the range between 15–65 microns.

5. A process for preparing a titanium tetraiodide suspension comprising in an inert environment (a) heating TiI$_4$ above its melting point and distilling free iodine, (b) mixing by high shear mixing means with a hydrocarbon which has the property of existing in a semi-solid state over a broad temperature range, and (c) cooling the mixture to below the freezing point of TiI$_4$.

6. A process according to claim 5 wherein said hydrocarbon is at least one member selected from the group consisting of petrolatums, paraffin waxes and heavy petroleum oils.

7. A process according to claim 6 wherein said hydrocarbon is a petrolatum.

8. A process according to claim 6 wherein mixing and distillation occur simultaneously.

9. A process according to claim 5 wherein a suspension is formed having a TiI$_4$ particle size in the range between 15–65 microns.

10. A process according to claim 5 wherein the hydrocarbon is a semi-solid at room temperature and the mixture is cooled to room temperature.

References Cited

UNITED STATES PATENTS

| | | | |
|---|---|---|---|
| 2,844,541 | 7/1958 | Work | 252—314 |
| 2,064,728 | 12/1936 | Calcott et al. | 252—314 |
| 2,904,397 | 9/1959 | Nielsen | 23—87 |

FOREIGN PATENTS

| | | |
|---|---|---|
| 945,766 | 1/1964 | Great Britain. |

OTHER REFERENCES

The New Standard Formulary, Hiss et al., 5th Revised Ed., G. P. Engelhard & Co., 1920, pp. 259–264.

DANIEL E. WYMAN, *Primary Examiner.*

L. G. XIARHOS, P. E. KONOPKA, *Assistant Examiners.*